United States Patent [19]

Cole

[11] 4,290,124
[45] Sep. 15, 1981

[54] REMOTE CONTROL CABLE DEPTH CONTROL APPARATUS

[75] Inventor: Jimmy R. Cole, Houston, Tex.

[73] Assignee: Syntron, Inc., Houston, Tex.

[21] Appl. No.: 956,730

[22] Filed: Nov. 1, 1978

[51] Int. Cl.³ .............................................. G01V 1/38
[52] U.S. Cl. ...................................... 367/18; 367/16; 114/245
[58] Field of Search ................................ 367/16–18; 114/331, 332, 244, 245

[56] References Cited

U.S. PATENT DOCUMENTS

| 3,434,446 | 3/1969 | Cole | 367/17 |
| 3,594,554 | 7/1971 | Pederson | 114/245 |
| 3,611,975 | 10/1971 | Ashbrook | 367/17 |
| 3,648,642 | 3/1972 | Fetrow et al. | 367/16 |
| 3,680,520 | 8/1972 | Smith | 367/18 |
| 3,896,756 | 7/1975 | Pearson et al. | 367/17 |
| 3,931,608 | 1/1976 | Cole | 367/17 |
| 4,027,616 | 6/1977 | Guenther et al. | 367/17 |

Primary Examiner—Howard A. Birmiel
Attorney, Agent, or Firm—Pravel, Gambrell, Hewitt, Kirk, Kimball & Dodge

[57] ABSTRACT

An apparatus to remotely control the depth in the water of a marine cable, such as a streamer of seismic geophones or hydrophones towed behind an exploration boat during seismic surveys of submerged formations, and maintain the cable at a desired depth. The depth at which the cable is maintained may be remotely adjusted for a range of selected depths. A new and improved attaching mechanism for attaching the depth control apparatus to the cable is provided.

4 Claims, 5 Drawing Figures

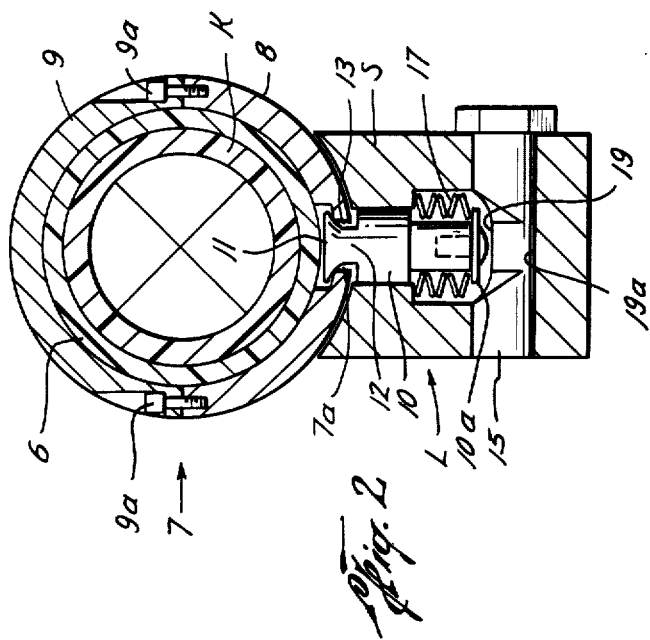
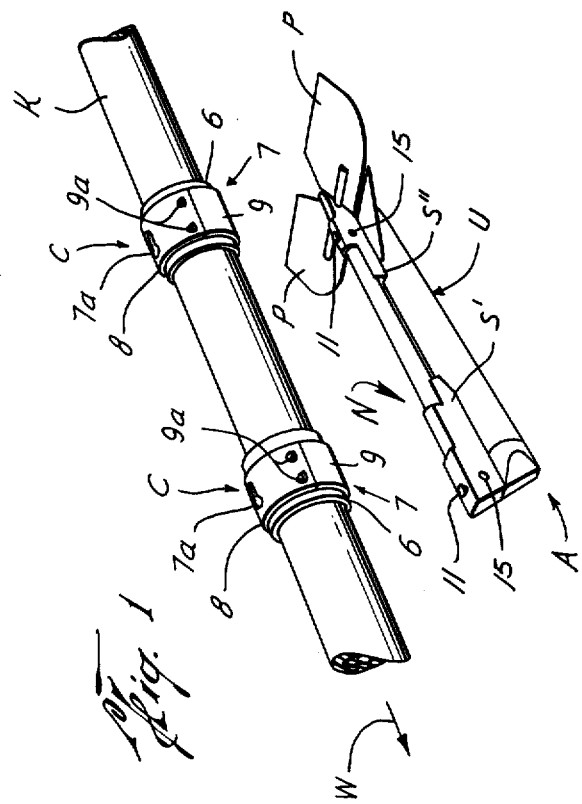
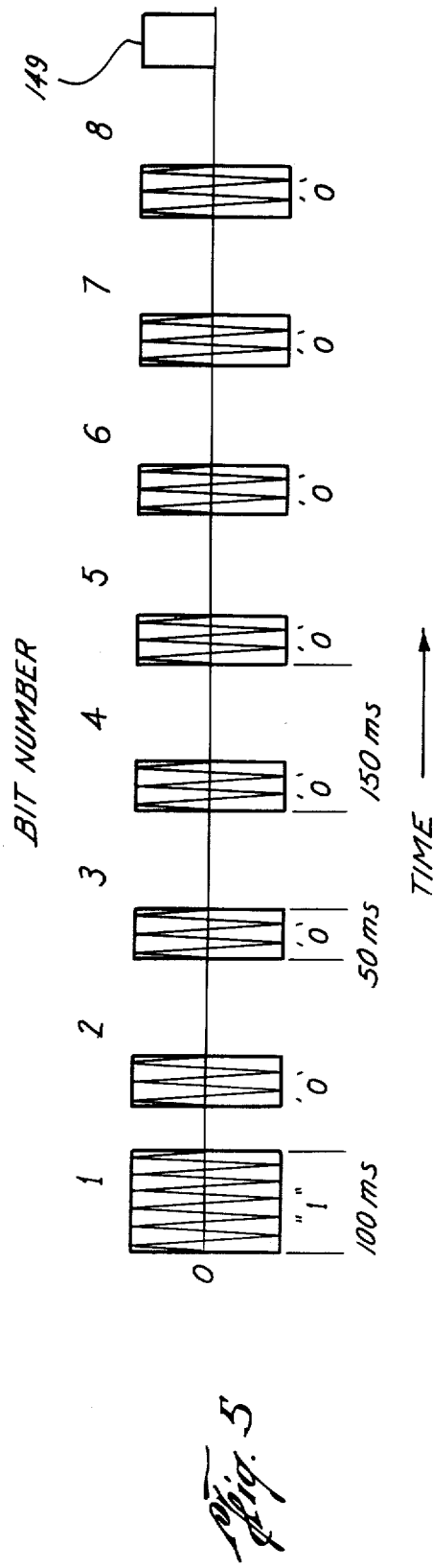

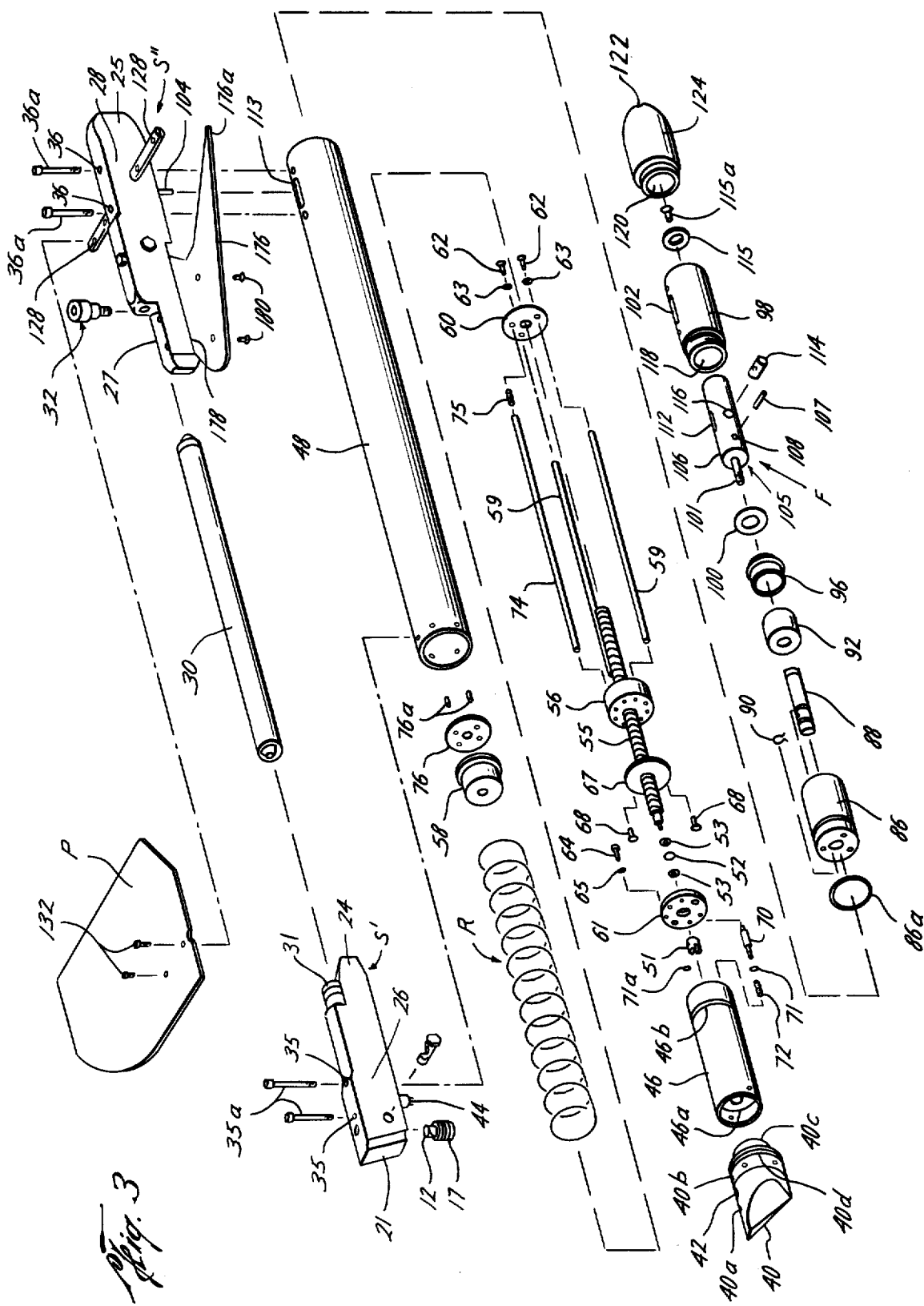

REMOTE CONTROL CABLE DEPTH CONTROL APPARATUS

CROSS-REFERENCE TO RELATED APPLICATIONS

The present application relates to seismic cable depth control, as does co-pending U.S. Patent Application Ser. No. 956,731, filed of even date herewith, now U.S. Pat. No. 4,222,340.

BACKGROUND OF THE INVENTION

1. Field of Invention:

The present invention relates to apparatus for controlling the depth of marine cables.

2. Description of Prior Art:

Remote controlled seismic cable depth controllers have in the past been of two general types or categories.

A first type, such as in U.S. Pat. Nos. 3,412,704; 3,541,989; and 3,605,674 have been based on controlling the depth of depth controllers or paravanes disposed at spaced positions on the cables by means of signals sent from transmitters mounted in the seismic cable near each controller to receivers in the controllers. Components of the controller adjusted the depth of the cable in response to the signals received at the receiver. These types of apparatus thus required a special cable for remote control seismic surveying, containing transmitters at spaced locations therein. Since typical seismic cables may reach one or two miles in length for survey operations, it was undesirable for economic reasons to require a special cable, different from that normally used, for remote control seismic surveying.

A second type of cable depth controller has used frequency responsive sensors in the depth controller to receive signals sent through a conductor in the cable (as in U.S. Pat. Nos. 3,648,642 and 3,673,556) or through the water (as in U.S. Pat. No. 3,412,704). However, the number of depths to which the controllers could be raised or lowered depended on the number of frequencies used. As the number of frequencies increased, the number of frequency-sensitive filters or frequency-sensitive relays in the controllers increased. The sensitivity of the frequency-sensitive members has to increase, so far as is known, if several frequencies were attempted for several different depths. Also, since analog signals were used with cycles of frequency specifying the desired depth, and these frequencies could drift, depth controllers could deviate from the desired depth settings and affect cable depth.

SUMMARY OF THE INVENTION

Briefly, the present invention provides a new and improved remote control seismic cable depth controller in response to digital control signal pulses sent down a wire in the cable from an exploration boat towing the cable. The signal is required to be transmitted only one time for a desired depth change and is present only for the time necessary to transmit the message (approximately one second). The digital control signal representing the desired operating depth of the cable is received and stored in a shift register, from which it is provided to a comparator circuit. The comparator circuit also receives a digital signal from an encoder circuit based on the present setting of a motor which controls the compressive force exerted by a spring on a piston exposed to ambient water pressure at the actual operating depth of the seismic cable. If the comparator circuit senses a difference in the two digital signals, it sends depth adjusting signals, either up or down commands, to a motor driver circuit, which causes the motor to change the force exerted by the spring on the piston to control the position of depth control diving planes to thus adjust the depth of the seismic cable to the desired operating depth.

The digital control circuit also senses emergency signals in the form of a "dive" signal and a "surface" or "reset" signal to cause the depth controllers to move to their maximum operating depth or to the surface of the water, respectively.

The motor, spring, inserts and piston members are contained within an opening in a control body or housing which is mounted to the cable at a spaced position therefrom. Diving planes, connected to the piston by a moment arm, cause the apparatus, and portions of the cable attached thereto, to move to the desired operating depth that is established by the reference spring force.

Another feature of the present invention includes a new and improved locking apparatus for attachment and locking of cable depth controllers having support shanks for mounting the controllers at spaced positions from the cable to connecting collars on the cable. A latch pin having a lock head member for engaging the connecting collar is mounted in the support shank. A spring is provided for pulling the connecting collar into engagement with the support shank of the depth controller for locking these members together. A rotatable cam is mounted in the support shank for selectively raising and lowering the latch pin to selectively disengage and engage the depth controller from the connecting collars on the seismic cable.

It is an object of the present invention to provide a new and improved seismic cable depth controller.

BRIEF DESCRIPTION OF THE DRAWINGS

FIG. 1 is an isometric view, partially exploded, of an apparatus of the present invention and a marine cable;

FIG. 2 is a cross-sectional view of a portion of the apparatus of FIG. 1;

FIG. 3 is an exploded isometric view of the apparatus of FIG. 1;

FIG. 5 is a pulse waveform diagram illustrating signals received in the circuit of FIG. 4.

DESCRIPTION OF PREFERRED EMBODIMENT

Figure 4:
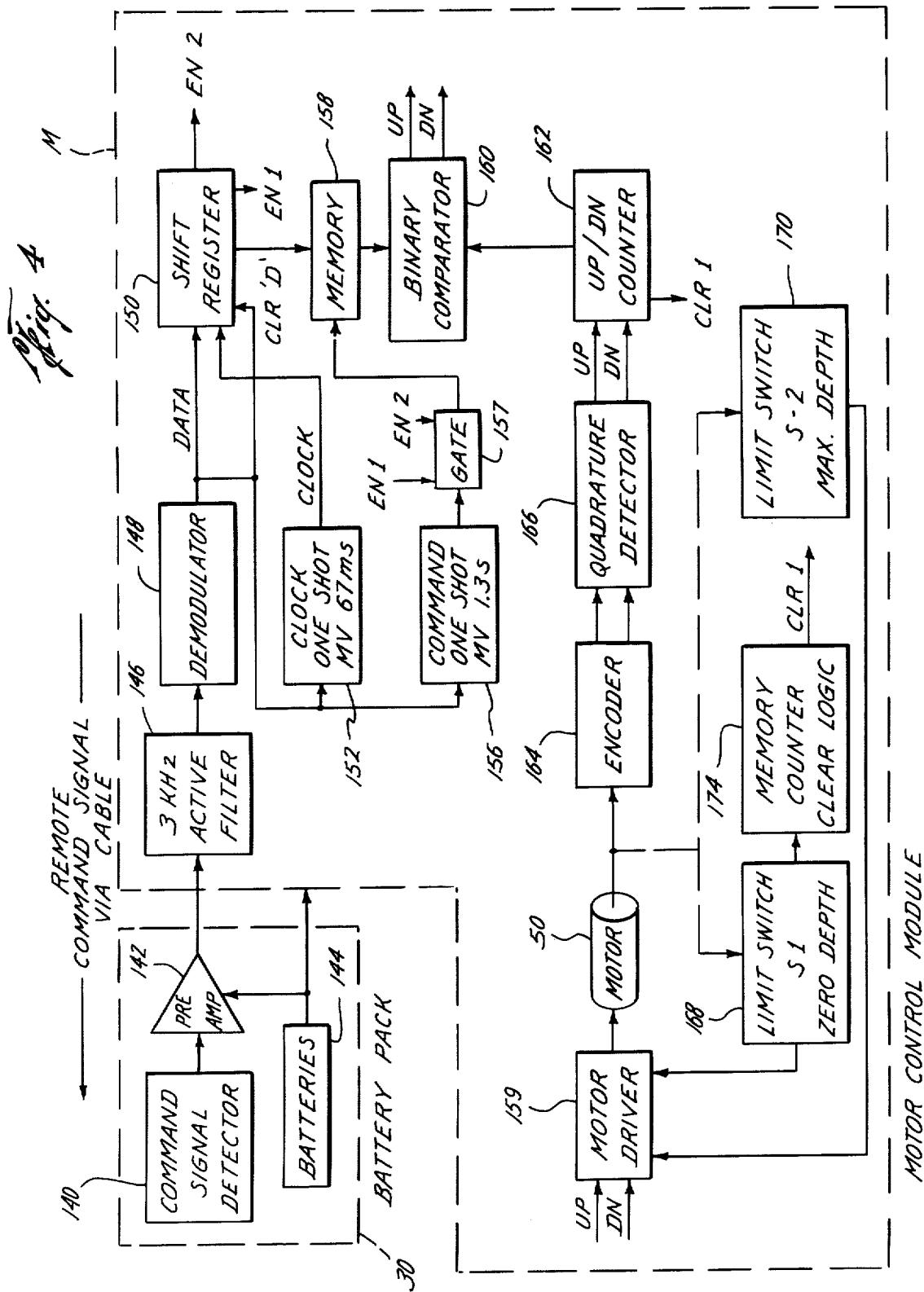
FIG. 4 is schematic electrical circuit of the control portion of the apparatus of FIG. 1.

In the drawings, the letter A designates generally an apparatus of the present invention for remotely controlling the depth of a seismic cable K of the conventional type, formed from vinyl or other suitable material, as the cable K is towed or pulled forward through a body of water in a direction indicated by an arrow W (FIG. 1) along its longitudinal axis behind a seismic exploration vessel of the conventional type. As will be set forth below, the apparatus A responds to digital control signals sent down a wire in the cable K and adjusts the depth of the cable K to desired operating depth represented by the control signal.

As is typical, the cable K is filled with kerosene or suitable liquid for neutral buoyancy in the body of water and contains at spaced locations therein plural seismic signal sensing geophones or hydrophones which detect seismic signals reflected from geological features underlying the body of water being explored. The sensing hydrophones are connected through suitable conductors in the cable K to the vessels to permit the response of these geological features to be recorded by suitable instruments on the vessel.

Typically, the cable K is several thousand feet in length, and plural remote depth control apparatus A of the present invention are mounted at suitably spaced locations with the cable K to keep the cable K at substantially the same depth, an important factor for accuracy in seismic surveying.

The apparatus A includes a depth control unit or assembly U, which includes therein a control module M (FIG. 4) which contains digital remote control circuitry to control the depth at which the cable is operating by controlling the angle of dive of diving planes P (FIGS. 1 and 3) through the action of a spring R and related mechanical structure to be set forth to move the cable K to the desired depth.

A connector means N mounts the depth control unit U to the cable K and includes a support shank S having front and rear portions S' and S", respectively, mounted between the control body U and the cable K. The rear support shank portion S" further has the diving planes P mounted therewith and extending sidewardly therefrom transversely to the longitudinal axis of the cable K. The connector means N further includes plural connecting collar assemblies C for attaching the support shank S to the cable K. The connecting collar assemblies may be, for example, of the type described in U.S. Pat. No. 3,931,608.

Considering the apparatus A more in detail, the connecting collar assemblies C (FIG. 2) each include a plurality of cylindrical inner races 6 mounted at desired positions with the cable K spaced from each other. The inner races 6 are preferably formed of two half cylinder members which are semi-circular in cross section, clamped around the streamer, and mounted to each other by screws or other suitable attaching means.

The center section of the inner races 6 is adapted to receive an outer race or locking collar 7. The locking collar 7 is preferably formed of two half-cylinder members 8 and 9 which are semi-circular in cross-section and mounted to each other by screws 9a or other suitable attaching means. The locking collars 7 are freely rotatably movable with respect to the inner races 6.

Each locking collar 7 has a locking slot 7a formed therein so that a latch or locking pin 10 (FIG. 2) of a locking apparatus L according to the present invention may be inserted therein to engage the connecting collar C and mount the support shank S with the cable K. The locking slot 7a is shown atop the cable K in the drawing, although when the depth control unit U and support shank S are attached thereto (FIG. 2), the slot 7a is beneath the cable K due to the weight of the attached structure.

The locking pins 10 include a circular head portion 11, inwardly tapering surfaces 12, and parallel surfaces 13 formed in the pin 10 below the head portion 11 and parallel to a longitudinal axis of the cable K and connecting collars C, as represented by arrow W (FIG. 1). In this manner, the head portion 11 may be inserted into the circular portion of the locking slot 7a and moved into position for locking engagement therewith, in a manner to be set forth.

A rotatable cam 15 is mounted with the support shanks S' and S" adjacent each locking pin 10 to lock the support shank S to the connecting collars C. The cam 15 is rotatably movable with respect to the support shank S to selectively raise and lower the locking pin 10 against the compressive force of a Belleville washer spring 17 by means of a reduced diameter camming surface 19. The spring 17 is held in place on the pin member 10 by means of a lower lip or rim member 10a. The cam 15 may be rotated to the position shown in FIG. 2 so that the cam 15 allows the locking pin 10 to be forced down by the spring 17 thus causing the locking collar 7 to be securely held to the support shank S by the compressive force of the spring 17. The cam 15 may be rotated 180° from the position shown in FIG. 2 so that a cam lobe 19a contacts the rounded portion of the lip 10a and raises the locking pin 10 against the force of the spring 17 thus allowing the locking pin 10 to be removed from the collar 7.

The front support shank S' includes a downwardly sloping nose portion 21 (FIG. 3) and a tapered tail portion 24. The support shank S" tapers toward a tail or end member 25.

The support shank S' further includes a top mounting shoulder 26 extending upwardly while a rear mounting shoulder 27 is formed on support shank S" extending upwardly from a body portion 28 forward of the tail portion 25. Each of the mounting shoulders 26 and 27 has openings formed therein for receipt of the locking pin 10 and cam 15 and related structure (FIG. 2).

A tubular power supply housing 30 is mounted between a front electrical socket 31 on the support shank S' and a hold down screw 32 attached to the support shank S". The power supply housing 30 contains therein a suitable number of batteries to provide operating electrical power to the control module M through conventional fluid-tight connections. Similarly, the housing 30 also contains a command signal detector and pre-amplifier for electrical signals, as will be set forth.

A plurality of vertical openings 35 are formed in the support shank S' for passage therethrough of connector screws 35a to connect forward portions of the control body C to the support shank S. Similar openings 36 are formed in the rear support shank S" for insertion of connector screws 36a to connect rear portions of the control body C to the support shank S".

The control body U has a front nose piece 40 shaped in the form of a prow-like member and having sockets 40a and 40b for receipt of the connector screws 35a. An electrical connector 42 is formed extending into the nose piece 40 for connection of conductors from a plug 44 mounted extending downwardly through the support shank S'. The conductors extend through a passage at the rear of nose piece 40 into an electronics housing 46.

The housing 46 has a front mounting socket 46a for engagement with a tail portion 40c of the nose 40. Suitable openings are formed adjacent the front socket 46a for insertion therethrough of connector screws for connecting the housing 46 to the nose portion 40. The housing 46 contains therein the control module M. The housing 46 is protected from the entry of water into the front end of the control body U by an O-ring seal 40d on nose piece 40.

An electrical motor 50 of the control module M (FIG. 4) drives an output shaft which passes through a fluid-tight opening to engage a motor coupler member 51 which is connected through a thrust bearing 52 mounted between thrust washers 53 to a front end of a threaded adjusting screw 55. The screw 55 has mounted thereon a forward spring insert 56 which engages a forward portion of the spring R and in conjunction with a rear spring insert 58 exerts selected amounts of compressive force on the spring piston R in a manner to be set forth.

The forward spring insert 56 is restrained against rotational movement during rotation of the threaded screw 55 by means of guide rods 59 which are mounted between a rear actuator rod guide plate 60 and a forward guide rod support plate 61 by means of suitable headscrews and washers 62 and 63, respectively. The guide rods 59 extend through suitable openings in the forward spring insert 56, as indicated in the drawings in order to restrain the forward spring insert against rotational movement during rotational movement of the screw 55 in response to the motor W. The forward guide rod support plate 61 is mounted with the housing 46 by means of a suitable number of screws 64 and washers 65.

A ball nut 67 is mounted by suitable screws 68 to a forward portion of the forward spring insert 56 for movement therewith. The ball nut 67 is adapted to contact a forward limit switch actuating pin 70 when the spring R is in the least compressed position, representing the uppermost, or surface operating depth for the apparatus A. The limit switch actuating pin 70 is connected through an O-ring 71 to a spring 72. When the ball nut 67 engages the pin 70, an electrical signal is generated for processing in the control module M to cause the depth control apparatus A to rise to the surface of the body of water in which the apparatus A in the cable K are being used.

A rear or second limit switch actuating rod 74 is mounted with an actuator rod spring 75 to the guide plate 60. As will be set forth below, the rear limit switch actuating rod 74 senses travel of the spring insert 56 to a most compressed position of the spring R representing the force created by ambient water pressure at the deepest operating depth desired for the apparatus A and provides an electrical signal in the control module M for processing, as will be set forth.

The aft or rear spring insert 58 is mounted in place by means of a spring insert mounting plate 76 by means of screws 76a so that the spring R is held in compression between the aft spring insert 58 and the forward spring insert 56 in the housing 48.

The spring R is maintained under a selected amount of compressive force between the spring inserts 56 and 58 representing the force caused by ambient water pressure acting on the piston 92 at the desired operating depth of the apparatus A. The amount of force on the spring R may be varied or adjusted by means of the threaded depth adjusting screw 55 in response to the motor 50 under control of the module M. The aft spring insert 58 contacts a piston rod extension 88 to transmit the compressional forces of the spring thereto.

Water is prevented from entering the aft end of the control body U by an O-ring 86a on the cylinder 86 and by the sealing diaphragm 96. If the sealing diaphragm 96 should fail water is prevented from flooding the housing 46 by O-rings 46b, 71 and 71a and by an O-ring seal on the output shaft of the motor 50.

A piston rod extension 88 (FIG. 3) extends through a central opening in the cylinder 86 and the aft spring insert 58 and receives a snap ring 90 for transmitting the desired operating forces from the spring R to a force comparator F. The piston rod extension 88 has an internal thread at a rear end portion for connection with a piston 92 in a manner to be set forth.

The piston 92 fits within a hollow rear portion of the cylinder 86. A diaphragm 96 is mounted between the cylinder 86 and a piston rod bearing in the manner set forth in the co-pending application referred to above, to seal the portion of the cylinder 86. A seal washer 100 mounts the diaphragm 96 to the piston 92 and is held in position along with the piston 92 on the piston rod extension 88 by a piston rod assembly 105 which is threaded along a front portion to engage and mount with similar threads on the piston rod extension 88.

The piston rod 106 is mounted to the piston rod 101 to form the piston rod assembly 105 by means of a lock pin 107 inserted through an opening 108 in the rod 106. The lock pin 107 rides in an annular groove 101b formed about the rod 101 so that the piston rods 101 and 106 are relatively rotatable, permitting the slot 112 in rod 106 to be rotated into alignment with the slot 102 in the bearing 98.

The piston rod bearing 98 has suitable threaded sockets formed therein (FIG. 4) for receipt of the connector screws 36a which pass through suitable openings in rear portions of the housing 48, which encloses the bearing 98 therein. A longitudinal slot or passage 102 is formed in the bearing 98 for passage therethrough of a moment arm 104 mounted with a piston rod 106. The piston rod 106 has a vertically extending slot 112 adjacent a similar slot 113 in the housing 48 for receipt of a lower end of the moment arm 104. Moment arm 104 is mounted in a bushing 114 which is mounted in a transverse port or passage 116 formed in piston rod 106 such that longitudinal movement of the piston rod 106 translates to rotational movement of the moment arm 104.

A limit washer 115 is mounted by a screw 115a to a rear portion of piston rod 106 to contact the bearing 98 and limit forward movement of the piston 92 in response to sudden changes downwardly in the depth of the cable K.

The piston rod 106 is mounted in an internal chamber or cavity 118 of the bearing 98. The chamber 118 and diaphragm 96 are subjected to ambient fluid pressure through a chamber 120 and rearwardly extending passage 122 formed in a tail piece 124. The tail piece 124 is mounted with a threaded front portion thereof engaging similar threaded portions of the bearing 98.

The passage 122 permits a force sensing instrument to be inserted into contact with the piston rod 106 so that the force exerted thereon by the spring R may be sensed with the diving planes P in a level position to calibrate the depth setting of the apparatus A. The moment arm 104 is mounted by a set screw to a diving plane shaft 128 which extends outwardly on each side of the support shank S to receive the diving planes P. The diving planes P are inserted into slots formed in the diving plane shafts 128 and are mounted thereto by screws 132 or other suitable means.

The moment arm 104 translates relative movement of the piston 92 within the cylinder 86 and piston rod bearing 98, in response to ambient water pressure and the force of the spring 92 in the force comparator F, into rotational movement of the diving plane shafts 128 and diving planes 130 in order to control the depth of the apparatus A and the cable attached thereto to a desired depth as required by the control module M.

Considering now the control module M more in detail (FIG. 4) a command signal detector 140 in the form of a secondary multi-turn coil of a conventional transformer whose primary winding is a wire inside the cable K with a sea water return. A depth control signal of digital pulses (FIG. 5) is transmitted from the source in the form of a three kilohertz carrier signal whose time duration is modulated according to whether a digital "1" or "0" is to be sent as the control signal down the cable K. The command signal detector 140 senses the pulses sent down the cable K and provides these pulses through a preamplifier circuit 142 which receives operating electrical power from batteries 144 contained within the battery housing 30 and provides amplified output pulses to the control module M. The batteries 144 further provide operating electrical power to the components of the module M.

In the control module M, a three kilohertz active filter 46 receives the pulses from the amplifier 142 and provides filtered output pulses to a demodulator 148. Demodulator 148 extracts the pulse envelope (shown schematically as 149 in FIG. 5) and provides these as data signal pulses to a shift register 150. Shift register 150 automatically clears in response to the first incoming data pulse. A clock one shot multivibrator 152 responds to leading edges of the data pulses and provides output clock pulses to the shift register 150. A command one shot multivibrator 156 responds to the leading edge of the first data pulse and forms a command signal, CMD, which is furnished to a gate 157.

The period of the command signal CMD is greater than the total time required to transmit a complete eight-bit message (FIG. 5). At the end of its period the CMD signal functions to clock or transfer the contents of the shift register 150 to a memory 158 provided that the first bit transmitted is a "1", the last bit is a "0" and a total of eights bits have been transmitted within the period of the CMD signal.

The circuitry of the control module M rejects noise pulses and prevents erroneous signals from being transferred into the memory 158. At the beginning of the 8-bit message, FIG. 5, the multivibrator 152 and the multivibrator 156 are triggered to their "on" states and the shift register 150 is cleared. Any previous message stored in the memory 158 is not affected at this point in time. The 8-bit message sent from the vessel down the cable is clocked into the shift register by the multivibrator 152. The contents of register 150 representing the first and last bits are examined by suitable gating circuitry to determine they are in fact "1" and "0", respectively. If this is the case, a valid message has been clocked into shift register 150, and EN1 and EN2 signals are sent from the shift register 150 to enable the gate 157 so that the output of multivibrator 156, at the end of its period, can clock or transfer the contents of shift register 150 to memory 158. With these conditions for transfer of the contents of the shift register 150 to memory 158, a great amount of noise rejection is achieved with the present invention. The memory circuit 158 is electrically connected to provide a first input to a binary comparator circuit 160. The binary comparator circuit 160 is further connected to receive a digital input signal from an up/down counter circuit 162. The digital signal from the counter circuit 162 represents the present operating depth of the cable, as indicated in a manner to be set forth below.

The binary comparator makes a comparison of the digital command signals presented thereto from the memory 158 representing the desired operating depth of the apparatus A with the output of the counter circuit 162. If the control signal from the memory circuit 158 represents a code specifying a greater depth than that presented to the comparator 160 from the counter 162, the comparator 160 forms a "down" control signal which is provided to a motor driver circuit 159, causing the motor 50 to rotate the shaft 55 to increase the compressive force exerted on the spring R by the inserts 56 and 58. Conversely, if the digital control code provided to the comparator 160 from the memory circuit 158 differs from the signal from the counter 162 indicating that a shallower operating depth for the apparatus A has been specified, the comparator 160 forms an "up" signal which is furnished to the motor driver 159, causing the motor 50 to rotate the shaft 55 to decrease the compressive force exerted on the spring R by the inserts 56 and 58, causing the apparatus A to rise to a shallower operating depth in the water.

An encoder circuit 164 senses the rotation of the shaft of the motor 50 driving the threaded screw 55 and energizes a quadrature detector circuit 166 which senses each successive ($\frac{1}{4}$) revolution of the shaft 55 and by sensing the direction of such revolution forms an "up" or "down" count pulse which is furnished, as indicated in FIG. 4 to the counter 162. In this manner, the counter circuit 162 stores therein a count representing the present operating position of the shaft 55 and the number of revolutions thereof, which in turn represents the compressive force exerted on the spring R by the inserts 56 and 58, thereby representing the present operating depth of the apparatus A in the body of water.

A limit switch circuit 168 responds to the mininum limit switch connected to pin 70 (FIG. 4) when the minimum or zero operating depth of the apparatus A is represented by the contact of the washer nut 67 with the pin of 70. The limit switch circuit 168 provides an electrical signal to the motor driver circuit 159, causing the motor driver circuit 159 to interrupt the flow of electrical power to the motor 50, causing the motor 50 to terminate rotation of the shaft 55. Similarly, a limit switch circuit 170 responds to contact of the maximum depth limit pin 74 by the spring insert 56 and furnishes an electrical control signal to the motor driver circuit 159, causing the motor driver circuit 159 to interrupt the flow of electrical power to the motor 50 and stop rotation of the shaft 55 when the maximum operating depth of the apparatus A is achieved. A clear logic circuit 174 is electrically connected to the limit switch circuit 170 to provide a clearing control signal to the memory 158 and counter 162 each time the minimum depth limit is attained as sensed by the limit switch connected to pin. This insures that the electronic components of control module M are reset to zero each time the mechanical limit set by the minimum limit switch is reached, establishing a mechanical zero setting in response to an electronic reset command signal.

In the operation of the remote control cable depth control apparatus A of the present invention, digital control pulses in the form of an eight bit group (FIG. 5) are formed in a suitable oscillator circuit on board the vessel towing the cable K and transmitted down the cable K. The first bit of a valid eight bit digital control code is always a digital "1". A digital "1" is represented by a carrier signal of a time duration of a first predetermined length, for example 100 milliseconds. Conversely, a digital "0" is represented by the carrier frequency being on for a shorter time duration, for example 50 milliseconds. The beginning of each pulse is spaced in time from the beginning of the preceding pulse by a suitable time interval, such as 150 milliseconds. With regard to the remaining bits of the digital control signal, the second bit is utilized to transmit an emergency surface or reset signal to the apparatus A. Such a signal is represented by a digital "1" so that the memory 158 transmits via comparator 160 a control signal to the motor driver circuit 159, causing the motor driver circuit 159 to energize the motor 50 regardless of the depth at which the apparatus A is presently operating so that the compressive force exerted on the spring R is reduced to the minimum, causing the apparatus A to rapidly climb through the body of water to the surface.

The next five bits in the digital control signal, namely bits 3 through 7 represent a control signal defining thirty possible operating depth increments through which the apparatus A may be specifically regulated. The seventh bit, bit 7 is the least significant bit in the control code, while the third bit is the most significant bit. With the present invention, by use of digital control signals, the depth of the apparatus A may be regulated over a wide range of specific increments in response to particular survey conditions as the need arises. Should additional depth increments be required, the digital control code would, of course, be correspondingly increased. The final bit of the control code, bit 8, is always a digital "0" which is used to indicate the termination of transmission of the digital code down the cable K.

The following chart represents a suitable example of a digital control code according to the present invention:

| Operating Depth In Meters | Bit Numbers 1 2 3 4 5 6 7 8 |
|---|---|
| 0 | 1 0 0 0 0 0 0 0 |
| 1 | 1 0 0 0 0 0 1 0 |
| 2 | 1 0 0 0 0 1 0 0 |
| 3 | 1 0 0 0 0 1 1 0 |
| 4 | 1 0 0 0 1 0 0 0 |
| 5 | 1 0 0 0 1 0 1 0 |
| 6 | 1 0 0 0 1 1 0 0 |
| 7 | 1 0 0 0 1 1 1 0 |
| 8 | 1 0 0 1 0 0 0 0 |
| 9 | 1 0 0 1 0 0 1 0 |
| 10 | 1 0 0 1 0 1 0 0 |
| 11 | 1 0 0 1 0 1 1 0 |
| 12 | 1 0 0 1 1 0 0 0 |
| 13 | 1 0 0 1 1 0 1 0 |
| 14 | 1 0 0 1 1 1 0 0 |
| 15 | 1 0 0 1 1 1 1 0 |
| 16 | 1 0 1 0 0 0 0 0 |
| 17 | 1 0 1 0 0 0 1 0 |
| 18 | 1 0 1 0 0 1 0 0 |
| 19 | 1 0 1 0 0 1 1 0 |
| 20 | 1 0 1 0 1 0 0 0 |
| 21 | 1 0 1 0 1 0 1 0 |
| 22 | 1 0 1 0 1 1 0 0 |
| 23 | 1 0 1 0 1 1 1 0 |
| 24 | 1 0 1 1 0 0 0 0 |
| 25 | 1 0 1 1 0 0 1 0 |
| 26 | 1 0 1 1 0 1 0 0 |
| 27 | 1 0 1 1 0 1 1 0 |
| 28 | 1 0 1 1 1 0 0 0 |
| 29 | 1 0 1 1 1 0 1 0 |
| 30 | 1 0 1 1 1 1 0 0 |
| Surface | 1 1 0 0 0 0 1 0 |
| Dive | 1 0 1 1 1 1 0 0 |

A generally delta-shaped flat diving plane guard member 176 is mounted in a lower socket 178 formed in the support shank S" and is held in place by means of screws 180 or other suitable means. The diving plane guard 176 is mounted ahead of the diving planes P (FIGS. 1 and 3) in the direction of longitudinal movement of the cable K and tapers outwardly from a leading portion to wing portions 176a. Further, the diving plane guard 176 is mounted substantially below the longitudinal axis of the cable K, being spaced therefrom by the thickness of the support shank S. In this manner, in the event that the seismic cable K and apparatus A encounter an obstacle or obstruction while being towed through a body of water, the spacing of the diving plane from the center-line axis of the cable provides a way for the apparatus A to rotate away from the passing obstruction, with less likelihood of damage to the apparatus A. Further, the wings of the diving plane guard 134 deflect debris and obstruction away from junctions 140 (FIG. 2) formed between the diving planes P and the support shank S to prevent clogging or jamming the diving planes P against movement.

To establish an operating depth, once the cable K has been deployed behind the towing vessel with apparatus A thereon, the digital code representing the desired depth is transmitted down the cable K. The control module M processes the received code and causes to motor M to adjust the force exerted on the spring R. Change of force on the spring R causes the diving planes P to adjust the depth of the apparatus A and correspondingly the cable K to that indicated by the digital code.

In the event it becomes necessary or desirable to change the depth of the cable K or to cause the cable K to surface or dive, the appropriate code is transmitted down the cable K. The control module M causes the motor 50 to change the force or spring R, as appropriate, and the diving planes P respond to cause the requisite change in depth of the cable K.

The foregoing disclosure and description of the invention are illustrative and explanatory thereof, and various changes in the size, shape and materials as well as the details of the illustrated construction may be made without departing from the spirit of the invention.

I claim:

1. A remotely controlled seismic cable depth controller having depth control vanes for controlling the depth of a seismic cable in response to digital control pulses which are modulated as a multi-bit message onto a carrier signal and sent down a wire in the seismic cable from an exploration boat, comprising:

(a) motor means for controlling the position of the depth control vanes on the controller by rotating a shaft to adjust the position of said vanes;

(b) means for receiving the modulated carrier signal, representing the desired operating depth, transmitted down the cable from the boat;

(c) filter means for filtering the data pulses from the modulated carrier signal;

(d) modulator means for extracting the data pulses of the digital control signal from said filter means;

(e) shift register means for storing the pulses of the digital control signal from said demodulator means;

(f) memory means for storing the contents of said shift register means on command;

(g) clock multivibrator means responsive to the data pulses for forming clock pulses for said shift register means;

(h) command multivibrator means responsive to a first of the data pulses for forming a signal, longer in time than the multi-bit message, which on expiration transfers the contents of said shift register means to said memory means;

(i) encoder means for sensing rotation of said shaft by said motor means;

(j) detector means for forming pulses in response to rotation of said shaft sensed by said encoder means;

(k) counter means for storing a count representing the present operating position of said shaft which thereby represents the present operating depth of the cable;

(l) digital comparator means for comparing the digital control signal from said shift register means with the count stored in said counter means;

(m) said digital comparator means further forming depth incrementing digital pulses to compensate for differences between the digital control signal and the count stored in said counter means; and (n) motor driver circuit means for forming motor drive signals to cause said motor means to rotate said shaft and adjust the position of said vanes of the depth controller to cause the depth controller and the seismic cable to adjust operating depth in response to the digital control signal.

2. The structure of claim 1, further including:

(a) maximum depth limit switch means for interrupting flow of power to said motor means when the depth controller reaches a maximum operating depth;

(b) minimum depth limit switch means for interrupting flow power to said motor means when the depth controller reaches a minimum operating depth.

3. The structure of claim 2, further including:

clear logic circuit means for forming a signal clearing said memory means and said counter means in response to said minimum depth limit switch means.

4. The structure of claim 1, wherein the multibit digital signal includes a first bit and a last bit, each of a predetermined state when a valid message is transmitted, and said shift register means comprises means forming enable signals in response to receipt of a valid message, and further including:

gate means responsive to the enable signals for passing the command signal from said command multivibrator means to said memory means.

* * * * *